(12) United States Patent
Jang-kun

(10) Patent No.: US 6,897,928 B2
(45) Date of Patent: May 24, 2005

(54) MULTI-DOMAIN LIQUID CRYSTAL DISPLAY

(75) Inventor: Song Jang-kun, Seoul (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 10/158,972

(22) Filed: Jun. 3, 2002

(65) Prior Publication Data

US 2003/0001998 A1 Jan. 2, 2003

(30) Foreign Application Priority Data

Jun. 28, 2001 (KR) .......................................... 2001-37758

(51) Int. Cl.[7] ............................................. G02F 1/1337
(52) U.S. Cl. ......................... 349/129; 349/128; 349/130
(58) Field of Search ................................ 349/129, 128, 349/130, 156

(56) References Cited

U.S. PATENT DOCUMENTS 5,986,724 A * 11/1999 Akiyama et al. ............. 349/41
6,256,080 B1 * 7/2001 Colgan et al. ............... 349/129
2003/0011729 A1 * 1/2003 Song et al. .................. 349/107

FOREIGN PATENT DOCUMENTS

| JP | 11295739 | 10/1999 | ......... G02F/1/1337 |
|---|---|---|---|
| JP | 2001-083522 | 3/2001 | ......... G02F/1/1337 |
| JP | 2001-188234 | 7/2001 | ......... G02F/1/1337 |

* cited by examiner

Primary Examiner—Tarifur R. Chowdhury
Assistant Examiner—George Y. Wang
(74) Attorney, Agent, or Firm—McGuireWoods LLP

(57) ABSTRACT

A thin film transistor array substrate for a liquid crystal display is provided with a gate line assembly, a data line assembly, thin film transistors, and pixel electrodes. Each pixel electrode has an opening pattern. A color filter substrate faces the thin film transistor array substrate while bearing color filters, a black matrix, and a common electrode. The common electrode has an opening pattern. The opening patterns of the pixel and the common electrodes partition the pixel region into a plurality of upper and lower domains and a plurality of left and right domains. The volume occupied by the upper and lower domains is established to be larger than the volume occupied by the left and right domains.

21 Claims, 16 Drawing Sheets

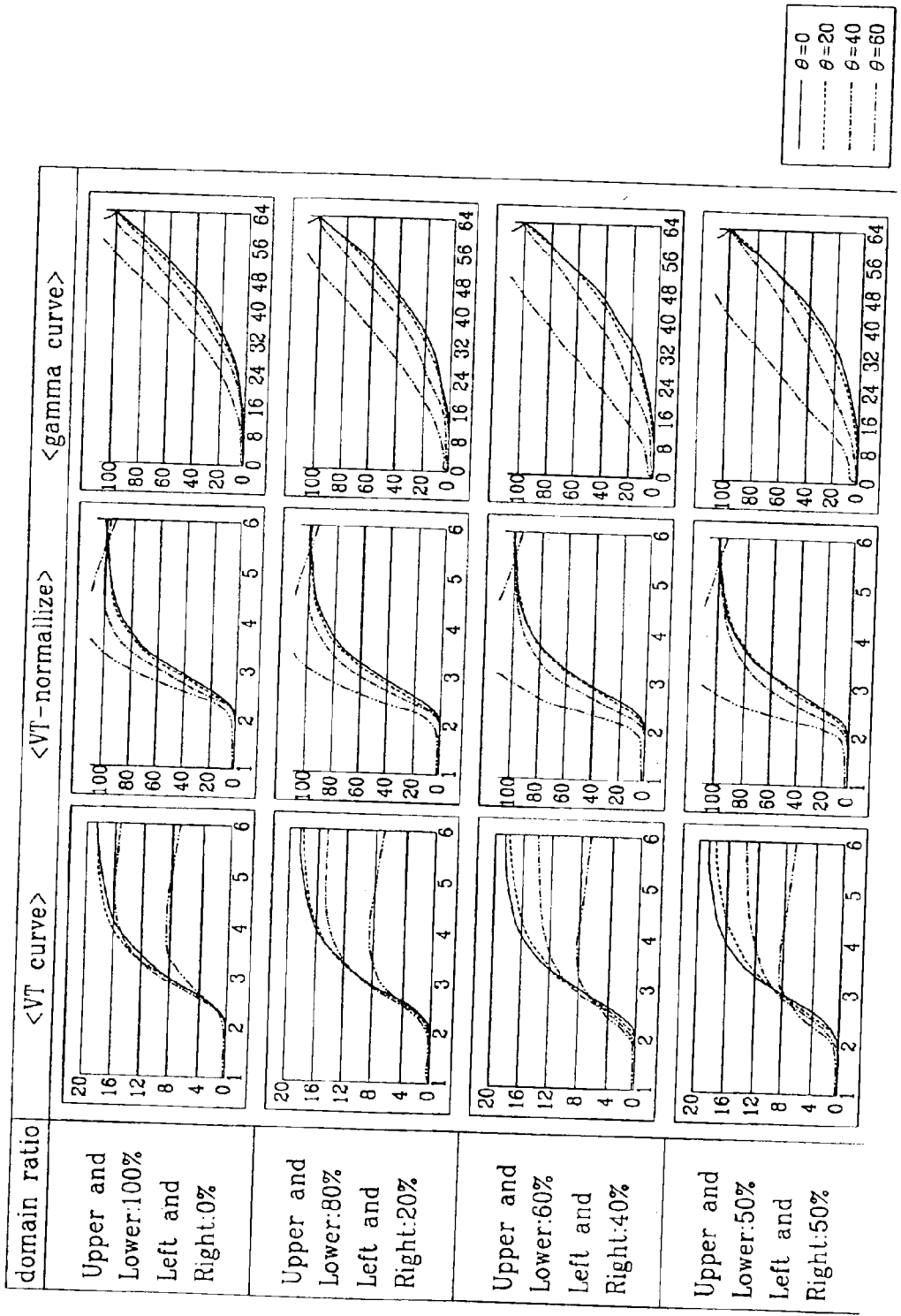

MULTI-DOMAIN LIQUID CRYSTAL DISPLAY

BACKGROUND OF THE INVENTION

1. Field of the Invention

The present invention relates to a liquid crystal display and, more particularly, to a vertically aligned mode liquid crystal display where a pixel region is partitioned into a plurality of micro-domains to obtain a wide viewing angle.

2. Description of the Related Art

Generally, a liquid crystal display (LCD) has a structure where a liquid crystal bearing dielectric anisotropy is sandwiched between a color filter substrate and a thin film transistor (TFT) array substrate. The color filter substrate has a common electrode, color filters and a black matrix, and the TFT array substrate has a TFT and a pixel electrode. An electric field is applied to the liquid crystal while being varied in strength, thereby controlling the light transmission and displaying the desired picture image.

Such a LCD usually involves a narrow viewing angle. In order to obtain a wide viewing angle, various techniques have been developed. Among such techniques, it has been proposed that the liquid crystal molecules are vertically aligned with respect to the substrates while forming opening or protrusion patterns at the pixel electrode and the common electrode facing each other.

In the opening pattern formation technique, an opening pattern is formed at the pixel electrode and the common electrode, respectively. Fringe fields are formed due to the opening patterns, and the inclining direction of the liquid crystal molecules is controlled by way of the fringe fields, thereby widening the viewing angle.

In the protrusion formation technique, a protrusion is formed at the pixel electrode and the common electrode, respectively. The electric field formed between the pixel electrode and the common electrode is deformed due to the protrusions, thereby controlling the inclining direction of the liquid crystal molecules.

Furthermore, it is also possible that an opening pattern is formed at the pixel electrode, while a protrusion is formed at the common electrode. Fringe fields are formed due to the opening pattern and the protrusion, and the inclining direction of the liquid crystal molecules is controlled by way of the fringe fields, thereby partitioning the pixel region into a plurality of micro-domains.

In such a multi-domain LCD, the contrast ratio-based viewing angle, or the gray scale inversion-based viewing angle is 80° or more in all directions, which is an excellent result. The contrast ratio-based viewing angle takes a contrast ratio of 1:10 as a reference value, and the gray scale inversion-based viewing angle is defined as a limitation angle of inter-gray scale brightness inversion. However, the LCD bears side gamma curve deformation where the center gamma curve and the side gamma curve are not agreed upon, and hence, involves deteriorated visibility from the left and right sides even when compared to a twisted nematic (TN) LCD.

For instance, in the case of a patterned vertically aligned (PVA) mode where an opening pattern is formed to obtain multiple domains, as the viewing angle becomes larger, the screen becomes brighter and the color becomes whiter. In an extreme case, the difference in distance between the bright gray scales is dissipated so that the picture image seems to be collapsed.

As the LCD has been recently developed for use in a multi-media use, it is desirable that still or motion picture images should be displayed with enhanced visibility.

SUMMARY OF THE INVENTION

It is an object of the present invention to provide a multi-domain LCD that provides excellent side visibility.

This and other objects may be achieved by a LCD where each pixel region is partitioned into upper and lower domains and left and right domains, and where the volume occupied by the upper and lower domains is established to be larger than the volume occupied by the left and right domains.

Specifically, the LCD includes a first insulating substrate, and a first wiring line assembly formed on the first insulating substrate with a plurality of first wiring lines. A second wiring line assembly crosses over the first wiring line assembly with a plurality of second wiring lines while defining pixel regions. The second wiring line assembly is insulated from the first wiring line assembly. A pixel electrode is formed at each pixel region. A TFT is connected to the first wiring line assembly, the second wiring line assembly, and the pixel electrode. A second insulating substrate faces the first insulating substrate. A common electrode is formed on the second insulating substrate. A first domain partitioning member is formed at any one of the first and the second insulating substrates. A second domain partitioning member is formed at any one of the first and the second insulating substrates. The first and the second domain partitioning members partition the pixel region into a plurality of left and right domains and a plurality of upper and lower domains. The volume occupied by the upper and lower domains is established to be larger than the volume occupied by the left and right domains.

The volume occupied by the upper and lower domains may be established to be 60–90% of the entire pixel region, or 80% or more of the entire pixel region. An opening pattern is formed at the pixel electrode as the first domain partitioning member. An opening pattern or a protrusion pattern may be formed at the common electrode as the second domain partitioning member.

The distance between the neighboring second wiring lines is repeatedly altered per a predetermined length, and both sides of the pixel electrode close to the wiring lines are patterned with the same outline as the wiring lines such that the pixel electrode has a narrow portion and a wide portion.

An opening pattern may be formed at the pixel electrode as the first domain partitioning member with first and second opening portions. The first opening portion partitions the narrow portion of the pixel electrode along the direction of the second wiring line, and the second opening portion partitions the wide portion of the pixel electrode along the direction of the first wiring line.

A storage capacitor line assembly may cross over the second wiring line assembly while being insulated from the second wiring line assembly. The storage capacitor line assembly has first and second storage capacitor lines overlapped with the first and the second opening portions, respectively.

The upper and lower domains are classified into first and second upper and lower domains where the directors of liquid crystal molecules are inclined in different directions. The volume occupied by the first upper and lower domains is larger than the volume occupied by the second upper and lower domains.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or the similar components.

FIGS. 8A and 8B are graphs illustrating the VT curves and the gamma curves as a function of occupation ratios of upper and lower pixel domains and left and right pixel domains when the pixel region is viewed in the left and right directions.

DETAILED DESCRIPTION OF THE PREFERRED EMBODIMENTS

Preferred embodiments of this invention will be explained in detail with reference to the accompanying drawings.

Figure 1:
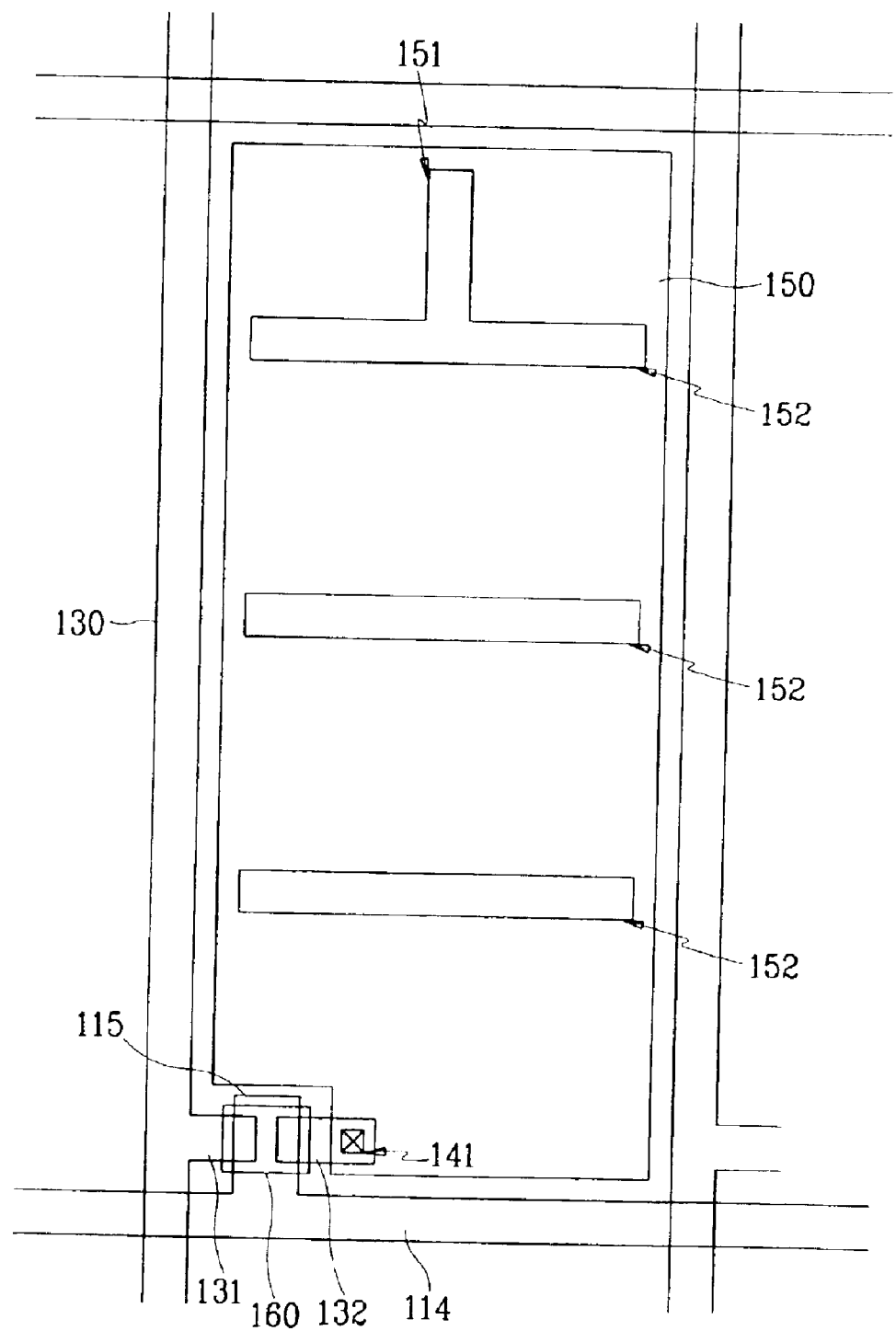
FIG. 1 is a plan view of a LCD according to a first preferred embodiment of the present invention, where an opening pattern of a pixel electrode is illustrated.
Figure 2:
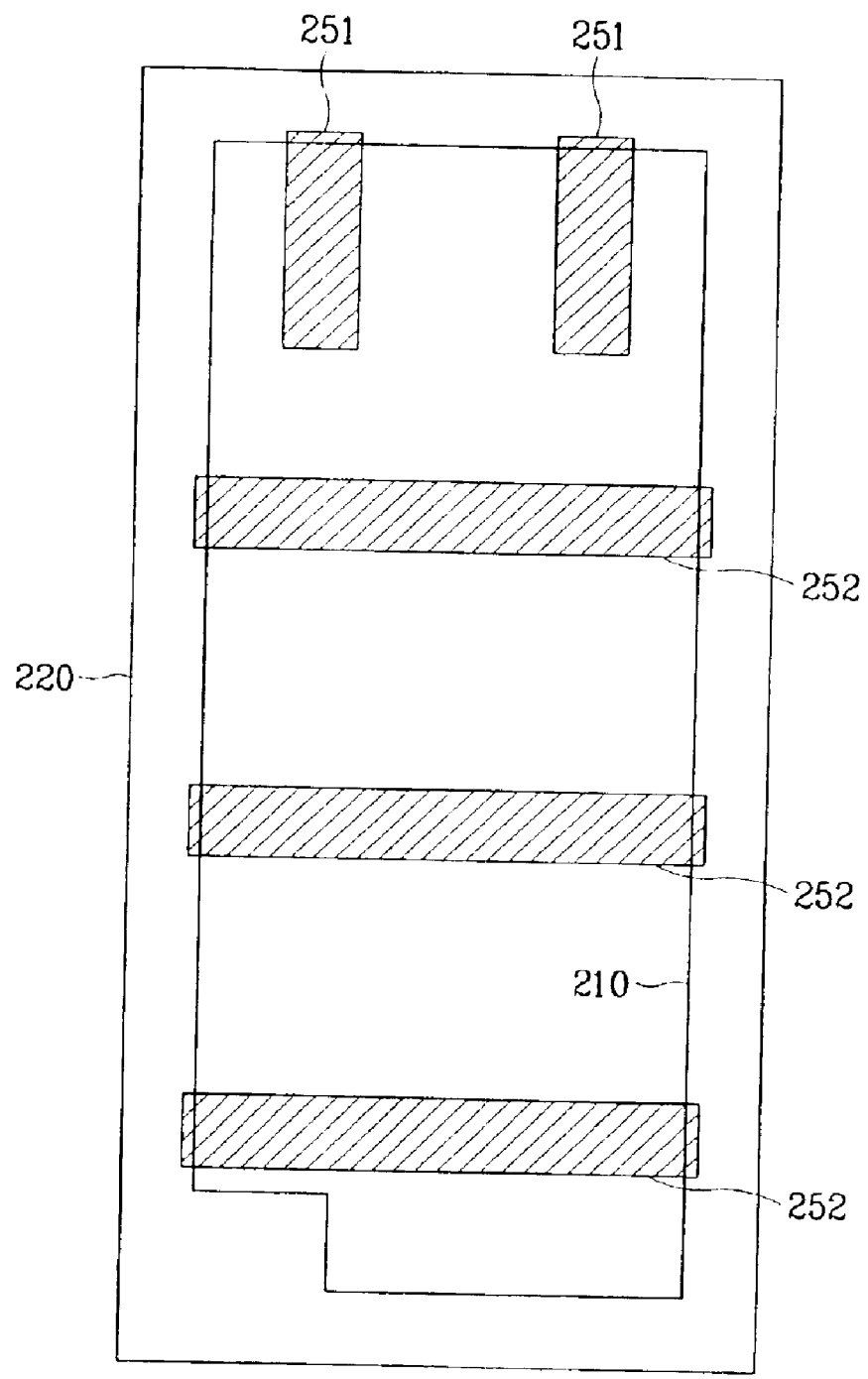
FIG. 2 illustrates an opening pattern of a common electrode for the LCD shown in FIG. 1.
Figure 3:
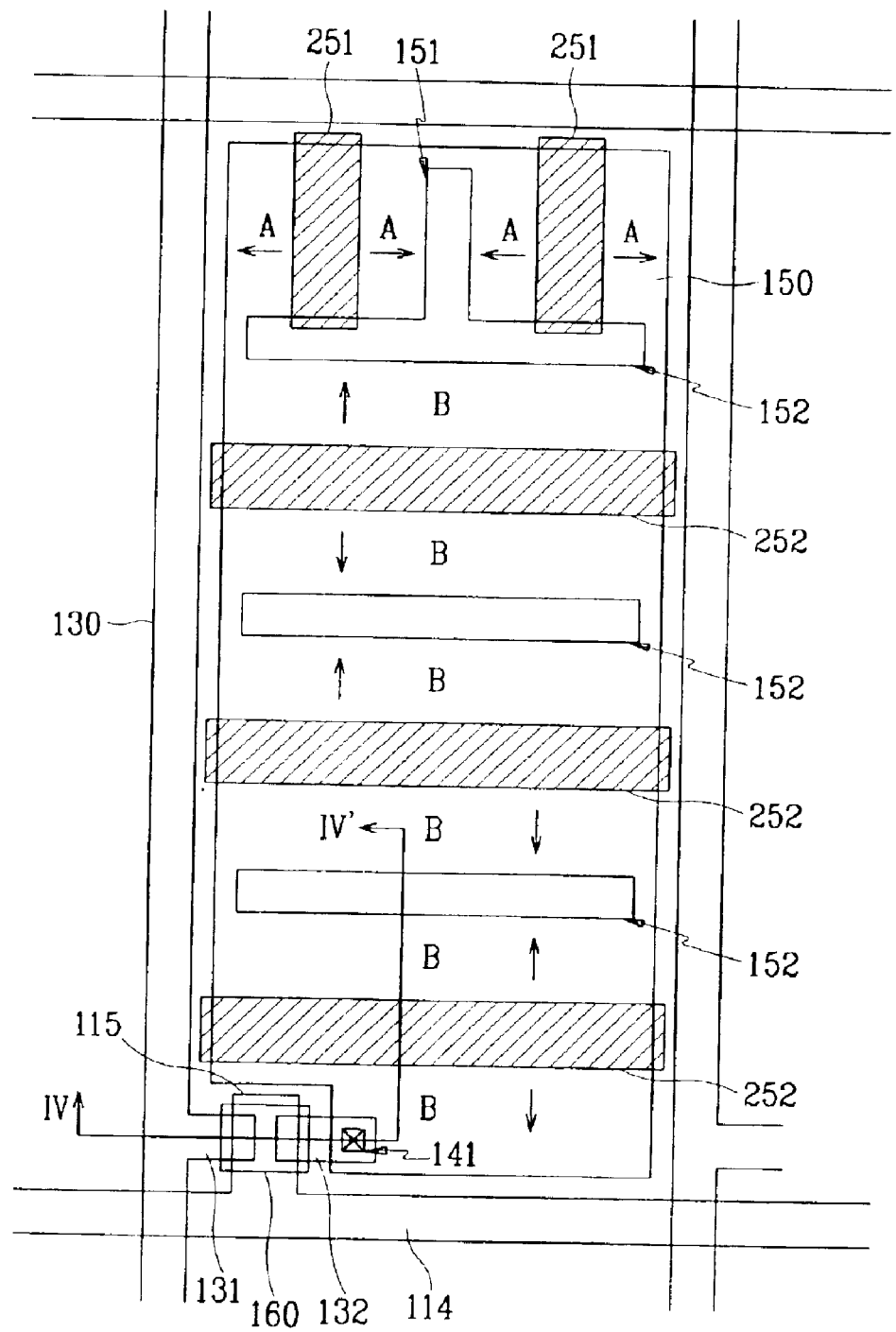
FIG. 3 illustrates the arrangement of the opening patterns of the pixel and the common electrodes for the LCD shown in FIG. 1.
Figure 4:
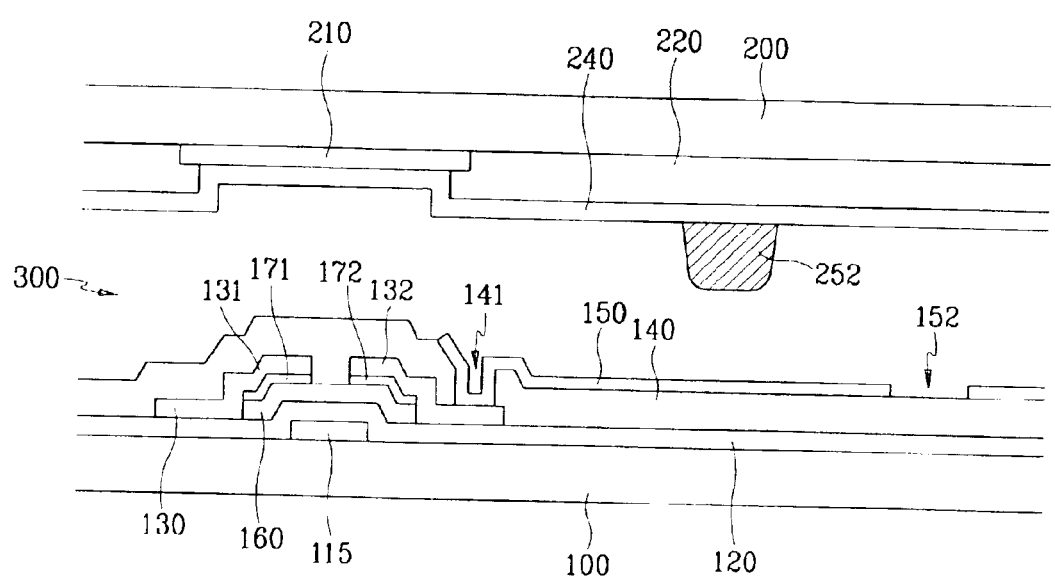
FIG. 4 is a cross sectional view of the LCD taken along the IV–IV' line of FIG. 3.

FIG. 1 is a plan view of a LCD according to a first preferred embodiment of the present invention, where an opening pattern of a pixel electrode is illustrated, and FIG. 2 illustrates an opening pattern of a common electrode for the LCD. FIG. 3 illustrates the arrangement of the opening patterns of the pixel and the common electrodes for the LCD. FIG. 4 is a cross sectional view of the LCD taken along the IV–IV' line of FIG. 3.

As shown in the drawings, a gate line assembly is formed on an insulating substrate 100. The gate line assembly includes gate lines 114 proceeding in the horizontal direction, gate pads (not shown) connected to ends of the gate lines 114 to receive gate signals from the outside and transmit them to the gate lines 114, and gate electrodes 115 extended from the gate lines 114 to form TFTs.

The gate line assembly may be formed with a single or multiple-layered structure. In the case of a single-layered structure, the gate line assembly is formed with aluminum (Al), or aluminum-neodymium alloy (Al—Nd alloy). In the case of a double-layered structure, the gate line assembly is formed with a bottom layer based on a material bearing excellent physicochemical characteristic such as chrome (Cr), molybdenum (Mo) or molybdenum alloy, and a top layer bearing lower resistivity such as aluminum (Al) or aluminum alloy.

A gate insulating layer 120 is formed on the gate line assembly with silicon nitride (SiNx).

A semiconductor pattern 160 is formed on the gate insulating layer 120 with hydrogenated amorphous silicon. The semiconductor pattern 160 is overlapped with the gate electrodes 115.

Ohmic contact patterns 171 and 172 are formed on the semiconductor pattern 160 with $n^+$ hydrogenated amorphous silicon where n type impurities are doped at high concentration. The ohmic contact patterns 171 and 172 are separated from each other around the gate electrode 115.

A data line assembly is formed on the ohmic contact patterns 171 and 172. The data line assembly includes source electrodes 131 formed on the one-sided ohmic contact pattern 171 while proceeding in the horizontal direction, data lines 130 connected to the source electrodes 131 while proceeding in the vertical direction, data pads (not shown) connected to one-sided ends of the data lines 130 to receive picture signals from the outside, and drain electrodes 132 formed on the other-sided ohmic contact pattern 172 while being separated from the source electrodes 131 around the gate electrodes 115.

The data line assembly may be formed with a single or multiple-layered structure. In the case of a single-layered structure, the data line assembly is formed with aluminum (Al), or aluminum-neodymium alloy (Al—Nd alloy). In the case of a double-layered structure, the gate line assembly is formed with a bottom layer based on a material bearing excellent physicochemical characteristic such as chrome (Cr), molybdenum (Mo) or molybdenum alloy, and a top layer bearing lower resistivity such as aluminum (Al) or aluminum alloy.

A passivation layer 140 is formed on the data line assembly. The passivation layer usually covers at least the channel area between the source and the drain electrodes 131 and 132. In this preferred embodiment, the passivation layer 140 entirely covers the data line assembly except for contact holes 141 exposing the drain electrodes 132 and contact holes exposing the data pads.

Pixel electrodes 150 are formed on the passivation layer 140 with a transparent conductive material such as indium tin oxide (ITO) or indium zinc oxide (IZO). Furthermore, subsidiary pads (not shown) are formed at the same plane as the pixel electrodes 150 with the same material while being placed over the gate pads, storage capacitor pads and the data pads. In a reflection type LCD, the pixel electrodes 150 may be formed with a metallic material bearing good light reflection characteristic such as aluminum.

As shown in FIG. 1, each pixel electrode 150 has an opening pattern with a vertical opening portion 151 and horizontal opening portions 152. The vertical opening portion 151 partitions the pixel electrode region into left and right micro-domains, and the horizontal opening portions 152 partition the pixel electrode region into upper and lower micro-domains. The volume occupied by the upper and lower micro-domains is established to be larger than the volume occupied by the left and right micro-domains. The volume ratio of the upper and lower micro-domains to the entire pixel electrode region is preferably established to be 60–90%. In the drawing of FIG. 1, one vertical opening portion 151 and three horizontal opening portions 152 are illustrated, but the number thereof may be altered at needs. However, the volume ratio of the left and right micro-domains to the upper and lower micro-domains is established to be 4:6–1:9 irrespective of the number of the opening portions 151 and 152.

A color filter substrate for the LCD will be now explained with reference to FIGS. 2 to 4.

A black matrix 210 is formed on a transparent insulating substrate 200 with an organic material containing black pigment while defining the pixel regions. Color filters 220 of red, green and blue are formed on the black matrix 210 at the pixel regions. A common electrode 240 (see FIG. 4) is formed on the color filters 220 with a transparent conductive material. A protrusion pattern is formed on the common electrode 240 with an organic material. The protrusion pattern is formed with vertical protrusions 251, and horizontal protrusions 252. The organic material for the protrusion pattern has a dielectric anisotropy different from that of the liquid crystal material 300 injected between the substrates. The protrusion pattern may be replaced by an opening pattern that is formed through patterning the common electrode 240. In this case, an over-coat layer is preferably provided between the color filters 220 and the common electrode 240 such that the color filters 220 are not exposed through the opening pattern.

The TFT array substrate shown in FIG. 1 is combined with the color filter substrate shown in FIG. 2, and a liquid crystal material 300 is injected between the substrates. The liquid crystal molecules contained in the liquid crystal material 300 are oriented such that the directors thereof are vertically aligned with respect to the substrates 100 and 200 with no application of an electric field between the pixel and the common electrodes 150 and 240. The TFT array substrate 100 and the color filter substrate 200 are arranged such that the pixel electrode 150 is correctly overlapped with the corresponding color filter 220. In this structure, the pixel region is partitioned into a plurality of micro-domains by way of the opening pattern and the protrusion pattern. The micro-domains are classified into left and right domains A, and upper and lower domains B. When an electric field is applied between the pixel electrode 150 and the common electrode 240, the directors of the liquid crystal molecules at the left and right domains A are inclined in the left and right directions, and those at the upper and lower domains B in the upper and lower directions. The inclining directions of the directors of the liquid crystal molecules are indicated in FIG. 3 by way of arrows.

The volume ratio of the upper and lower domains B to the left and right domains A is established to be 6/4–9/1. In this way, the viewing angle based on visibility can be widened. This will be now explained with reference to FIGS. 5 to 11.

Figure 5:
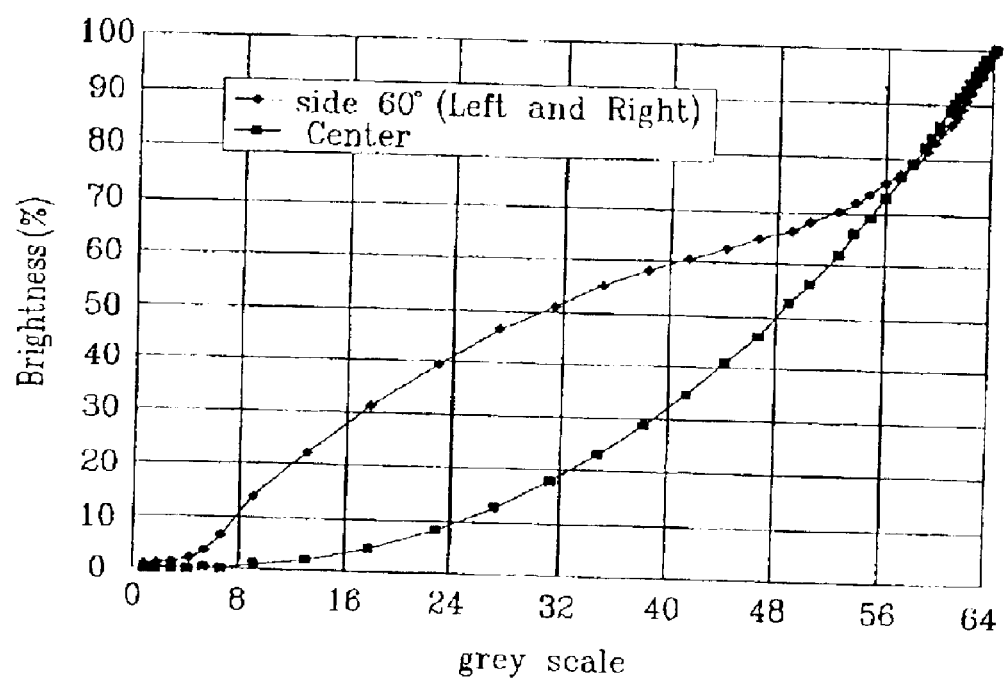
FIG. 5 is a graph illustrating the gamma curves at the center and the 60° side of a test cell, respectively.

FIG. 5 is a graph illustrating the gamma curves at the center and at the 60° side of a test cell.

As seen in the graph, the gamma curve at the center of the test cell proceeds above the gamma curve at the 60° side of the test cell. Particularly, as the distance between the center gamma curve and the side gamma curve is very significant at the lower gray scales, the brightness difference of two to ten times or more is made depending upon whether the same gray scale is viewed from the center or from the side. As the respective gray scales of red, green and blue are altered in a separate manner, the deformation degree of the side gamma curve is differentiated at the pixels of red, green and blue. Therefore, the color sensation is differently made at the center and the side. For instance, as illustrated in the graph, assuming that the respective pixels of red (R), green (G) and blue (B) bear a gray scale of 56, 48 and 24, respectively, when viewed from the center, the composition ratio of red (R), green (G) and blue (B) is as shown below:

R:G:B=73:50:10=55%:37%:8%

By contrast, when viewed from the 60° side, the composition ratio of red (R), green (G) and blue (B) is as shown below.

R:G:B=75:66:41=41%:36%:23%

Consequently, the blue content is increased by three times or more compared to the former case so that an entirely different color is made.

As the gamma curve is deformed with the outline shown in FIG. 5, the low ratio color at the center becomes increased at the 60° side, whereas the high ratio color at the center becomes decreased at the 60° side. Accordingly, the color ratios of red, green and blue are approximated to each other. The colors that seem to be different when viewed from the center, but similar when viewed from the 60° side, are totally reduced in chrominance, and shifted into white. This is called the "white-shift." The white shift causes deterioration in color reproduction, and results in unclear picture images. This is because the gamma curve is seriously deformed at the lower gray scales. Even though such a gamma deformation is made at the higher gray scales, only a negligible variation is made. By contrast, in the case where the gamma deformation is made at the lower gray scales, the brightness becomes differentiated by two to ten times or more. Such a significant brightness differentiation causes occurrence of the white shift in a large scale.

Figure 6:
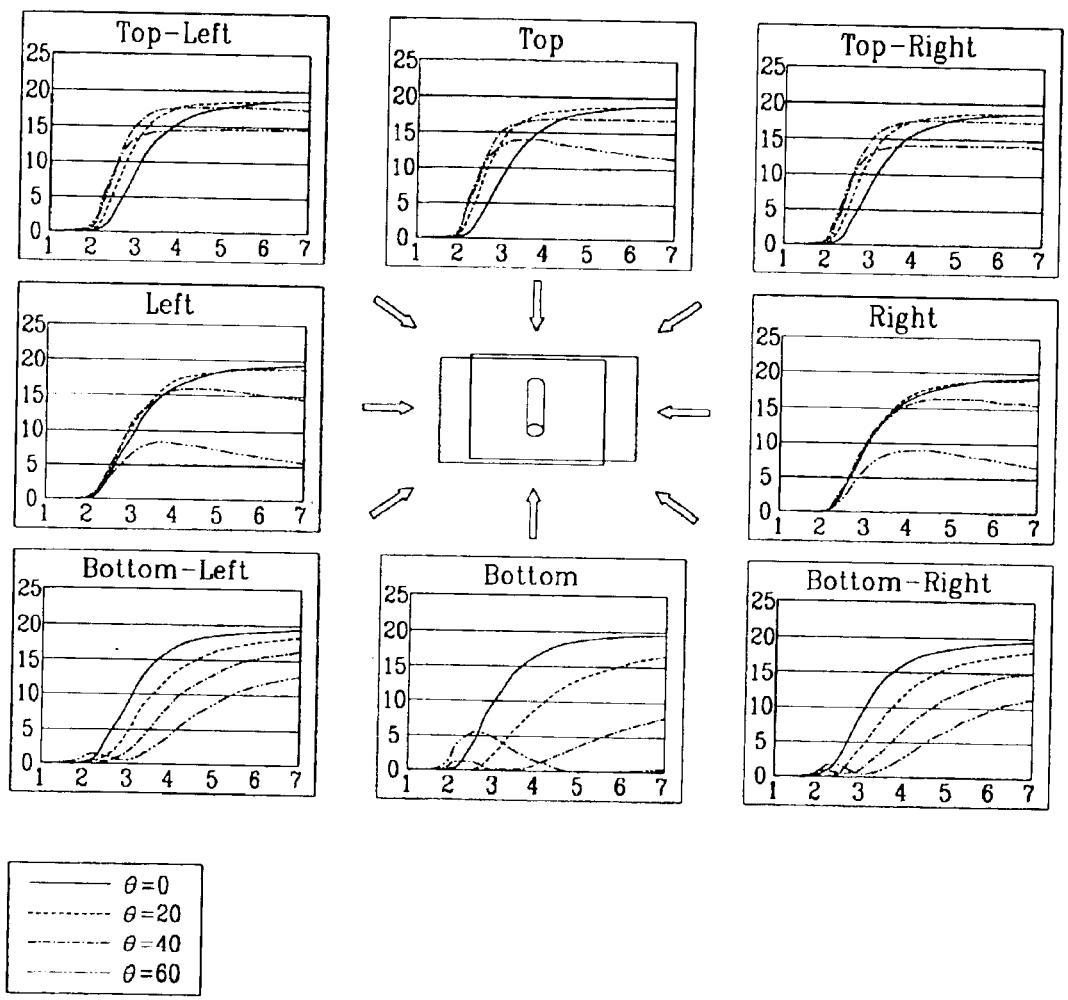
FIG. 6 is a graph illustrating the VT curves when a single-domain vertically aligned mode LCD cell is viewed in eight directions.

FIG. 6 illustrates the VT curves when a single-domain vertically aligned mode LCD cell is viewed in eight directions.

As shown in FIG. 6, the phenomenon where the VT curve moves to the left at the lower gray scales appears significantly at the upper or lower side. The VT curve elevates at the left and right sides with the lower gray scales while making the same curve as with the center. The gray scale inversion is initially made at the left bottom and the right bottom. The VT curve again moves to the right while making an elevating curve. Accordingly, the phenomenon where the gamma curve is deformed upward at the lower gray scales becomes serious in the case where the direction of observing the LCD cell and the inclining direction of the liquid crystal molecules under the application of an electric field are the same, but weakens in the case where those directions perpendicular to each other. Therefore, in order to enhance the viewing angle based on the visibility at the left and right sides, the upper and lower domains, where the directors of the liquid crystal molecules are inclined in the upper and lower directions, should be enlarged as much as possible. Furthermore, in order to enhance the viewing angle based on the visibility at the upper and lower sides, the left and right domains, where the directors of the liquid crystal molecules are inclined in the left and in the right directions, should be enlarged as much as possible.

Figure 7:
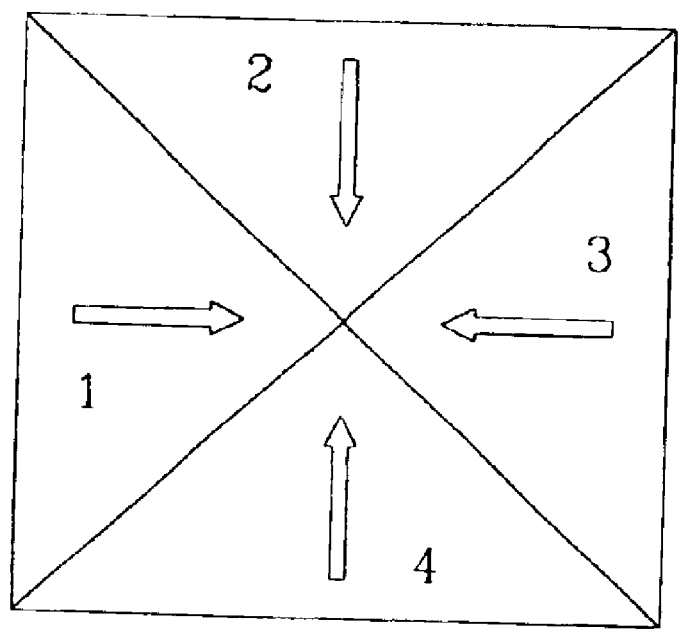
FIG. 7 illustrates the arrangement of directors of main liquid crystal molecules within each pixel domain.

FIG. 7 is a conceptual view illustrating the arrangement of the directors of the liquid crystal molecules at each pixel domain.

In order to enhance the viewing angle based on the visibility at the left and right sides, the volume occupied by the first and third domains should be reduced, while the volume occupied by the second and fourth domains should be enlarged. To the contrary, in order to enhance the viewing angle based on the visibility at the upper and lower sides, the volume occupied by the first and third domains should be enlarged, while the volume occupied by the second and fourth domains should be reduced. That is, the improvement in the viewing angle at the left and right sides, and the improvement in the viewing angle at the upper and lower sides are in an inverse relation to each other. However, when viewed from the standpoint of the user, the viewing angle at the left and right sides is more important than that at the upper and lower sides. Therefore, in this preferred embodiment, the volume of the second and fourth domains is increased, while the volume of the first and third domains is reduced.

Figure 8B:
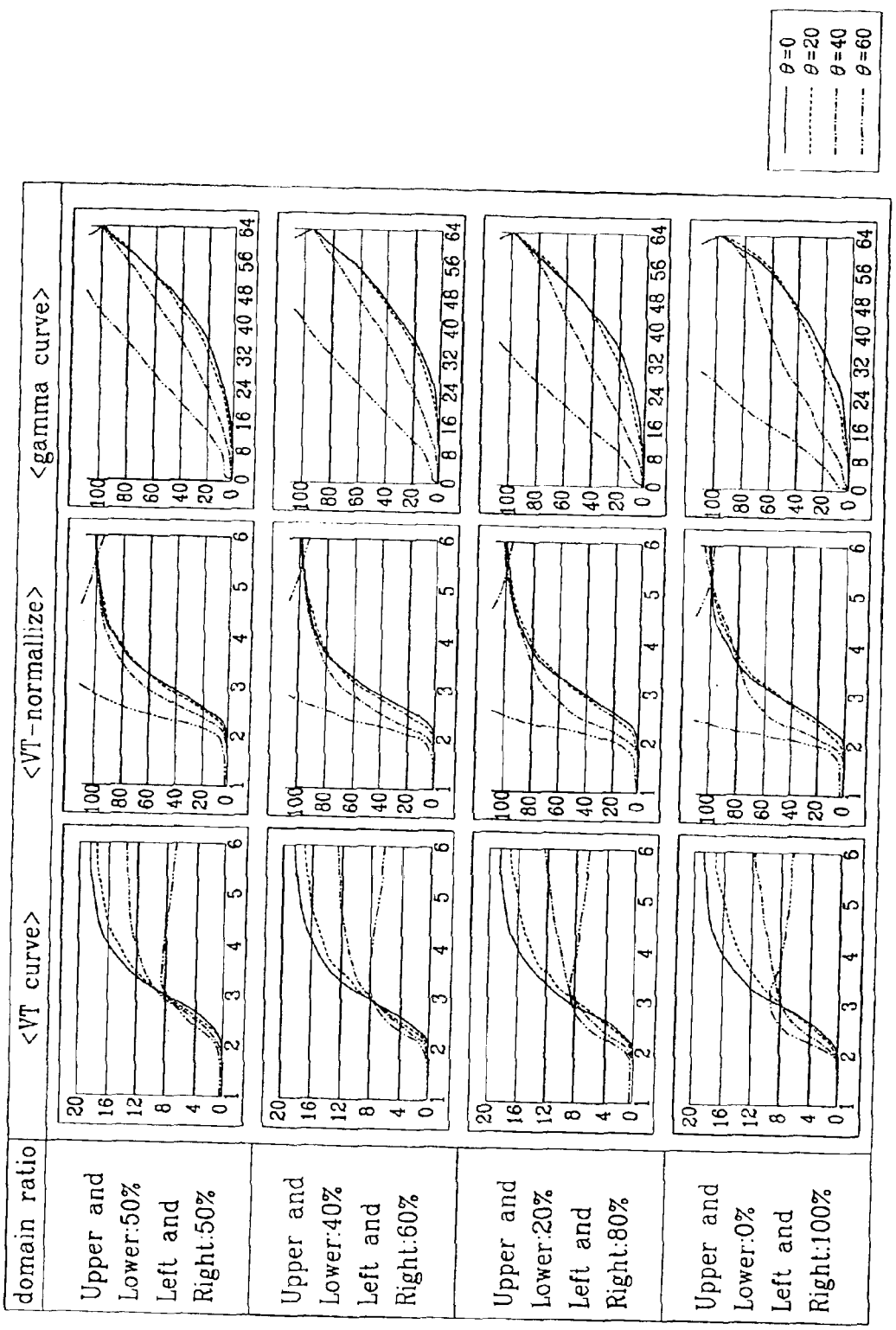

FIGS. 8A and 8B are graphs illustrating the side VT and gamma curves as a function of the occupation ratios of the upper and lower domains and the left and right domains when the pixel is viewed in the left and right directions.

As known from the graphs, the greater the volume of the upper and lower domains B at the pixel region is, the deformation of the gamma curve at the left and right sides becomes reduced. That is, all of the domains at a pixel region should be formed as the upper and lower domains B to maximize the visibility at the left and right sides. However, in the case where the left and right domains A are absent, the visibility in the upper and lower directions becomes seriously deteriorated. Therefore, it is preferable that the ratio of the upper and lower domains B should be established to be 60–90%.

Figure 9A:
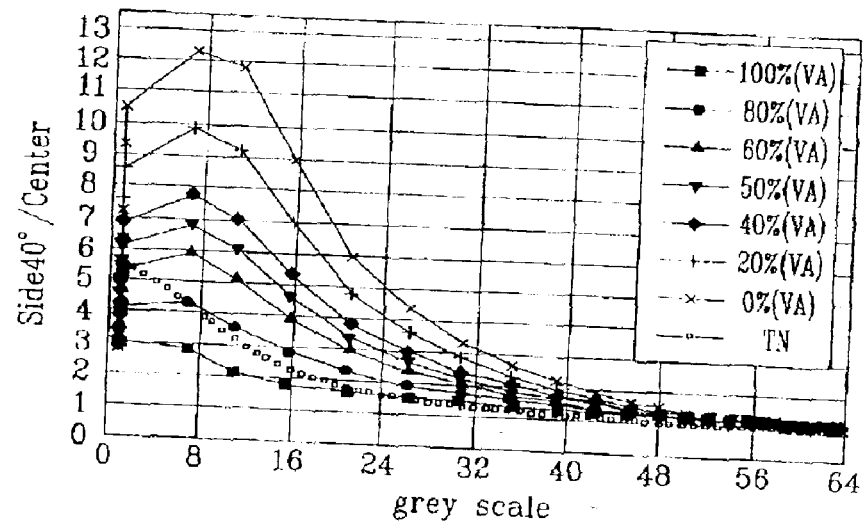
FIGS. 9A and 9B are graphs illustrating the deformation ratios of the side gamma curve to the center gamma curve as a function of occupation ratios of the upper and lower pixel domains.
Figure 9B:
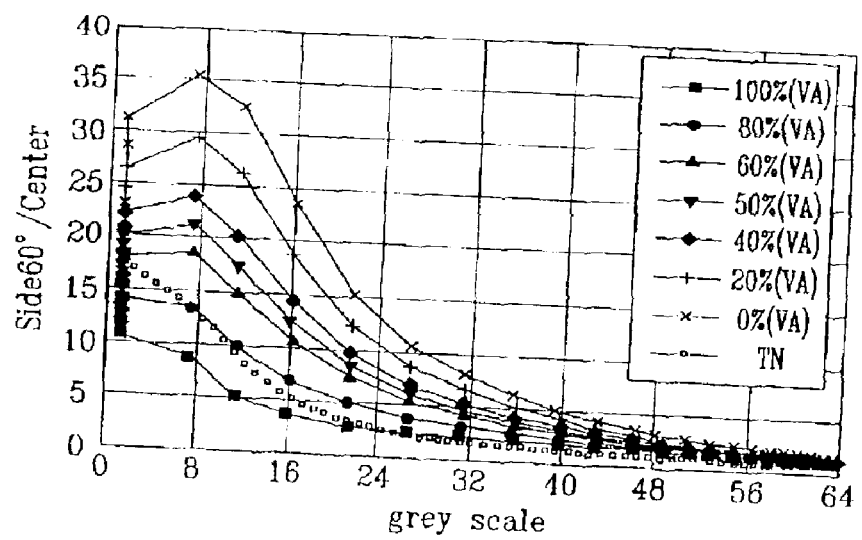

FIGS. 9A and 9B are graphs illustrating the deformation ratio of the side gamma curve to the center gamma curve as a function of the occupation ratio of the upper and lower domains.

FIG. 9A illustrates the case where the pixel region is viewed from the 40° side, and FIG. 9B illustrates the case where the pixel region is viewed from the 60° side. In both cases, the gamma curve deformation ratio of a 17-inch TN mode LCD is illustrated together for comparison. As the TN mode involves a single domain, the gamma deformation in the left and right directions is extremely small, but significantly large in the upper and lower directions. Therefore, in case only the left and right directions are taken in consideration, it follows that the visibility of the TN mode LCD is good.

It can be seen from the graphs of FIGS. 9A and 9B that when the occupation ratio of the upper and lower domains B is 80% or more, the side visibility becomes better compared to the TN mode. The TN mode LCD is a practical panel, and the VA mode is a test cell. In consideration that the practical panel bears better performance characteristic compared to the test cell, the possibility of reduction in the deformation of the gamma curve is higher with the practical panel.

Figure 10:
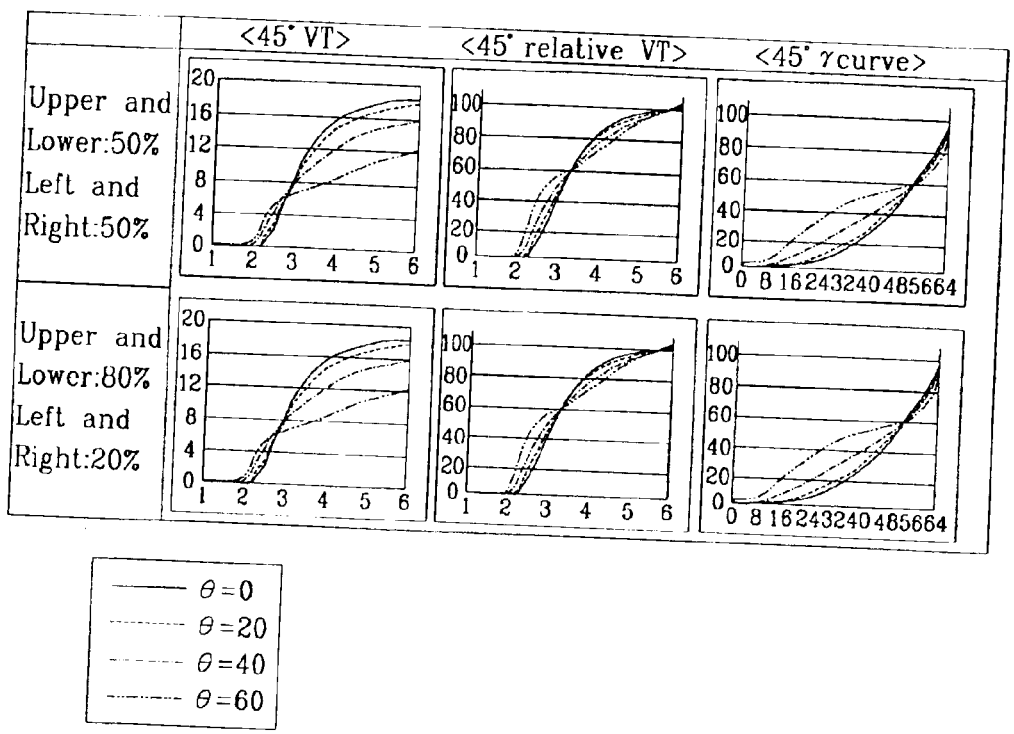
FIG. 10 is a graph illustrating the VT curves and the gamma curves in the diagonal direction (ø=45°) when the occupation ratios of the upper and lower pixel domains are 50% and 80%, respectively.
Figure 11:
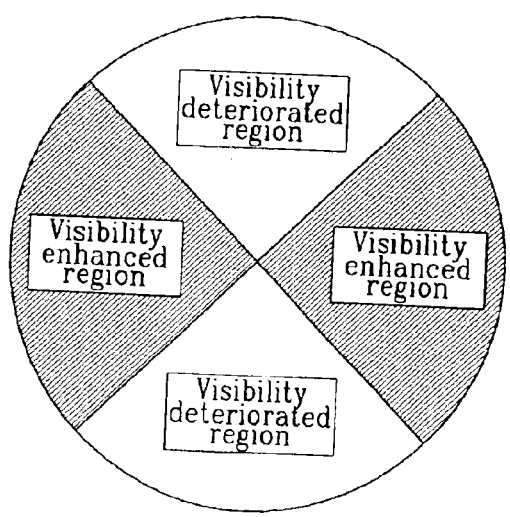
FIG. 11 is a graph illustrating the domains with enhanced visibility and the domains with deteriorated visibility when the occupation ratios of the upper and lower pixel domains are elevated.

FIG. 10 is a graph illustrating the VT curves and the gamma curves in the diagonal direction ($\phi=45°$) in the case where the occupation ratios of the upper and lower domains B are 50% and 80%. FIG. 11 is a graph illustrating the regions bearing good and bad visibility in the case where the occupation ratio of the upper and lower domains B becomes heightened.

It can be seen from the graph that the VT curves and the gamma curves where the occupation ratios of the upper and lower domains B are 50% and 80% are not differentiated from each other in the diagonal direction ($\phi=45°$). That is, the VT curve and the gamma curve are not influenced by the occupation ratio of the upper and lower domains B in the diagonal direction. Even though the occupation ratio of the upper and lower domains B becomes higher, the visibility in the diagonal direction is not enhanced. This is because the visibility in the upper and lower directions and the visibility in the left and right directions are in an inverse relation to each other, while the visibility in the diagonal direction is placed at the borderline area between them. That is, in case the occupation ratio of the upper and lower domains B is increased, as shown in FIG. 11, the visibility becomes enhanced in the range of $-45°<\phi<-45°$, but deteriorated in the range of $45°<\phi<135°$.

Figure 12:
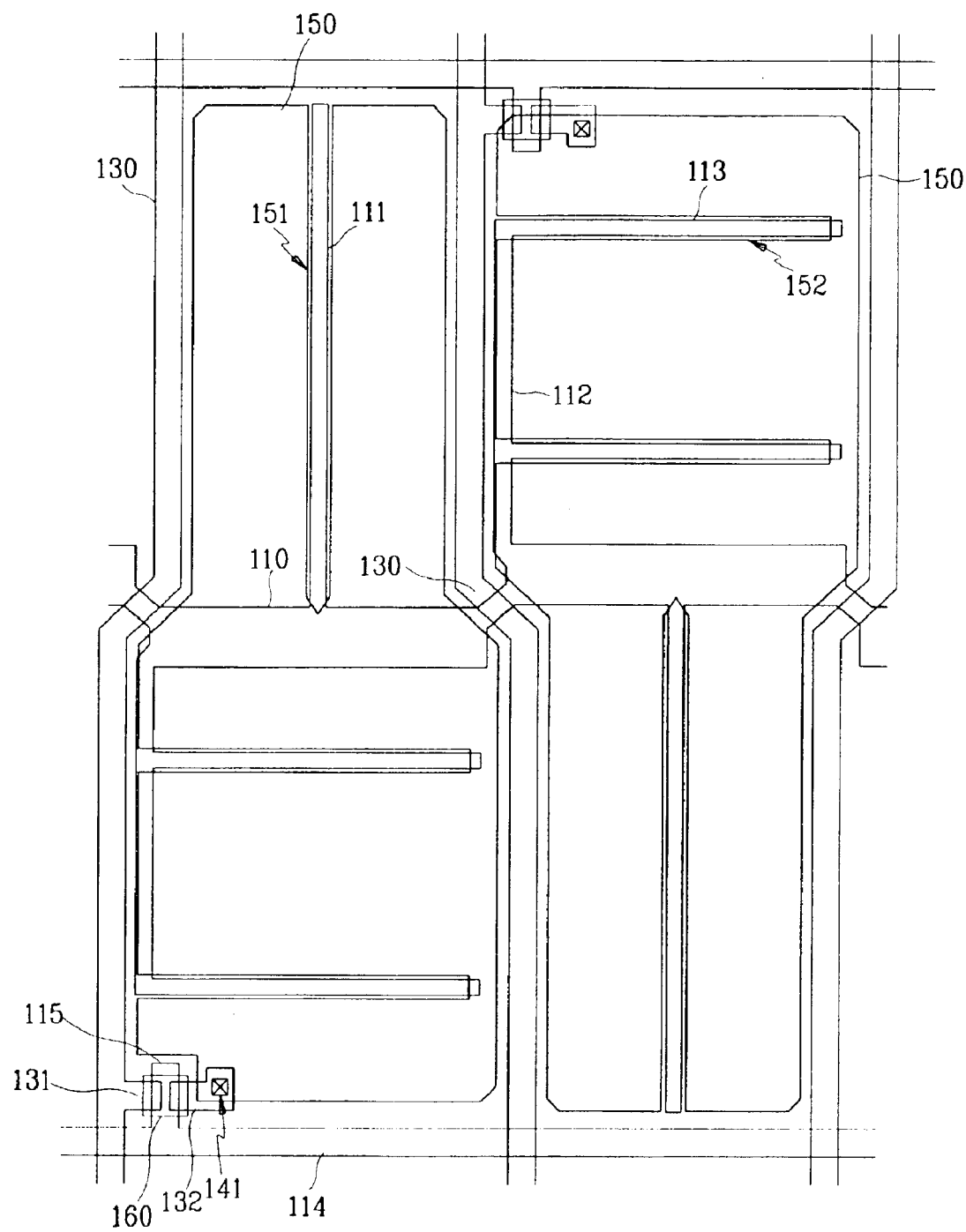
FIG. 12 is a plan view of a LCD according to a second preferred embodiment of the present invention, where an opening pattern of a pixel electrode is illustrated.
Figure 13:
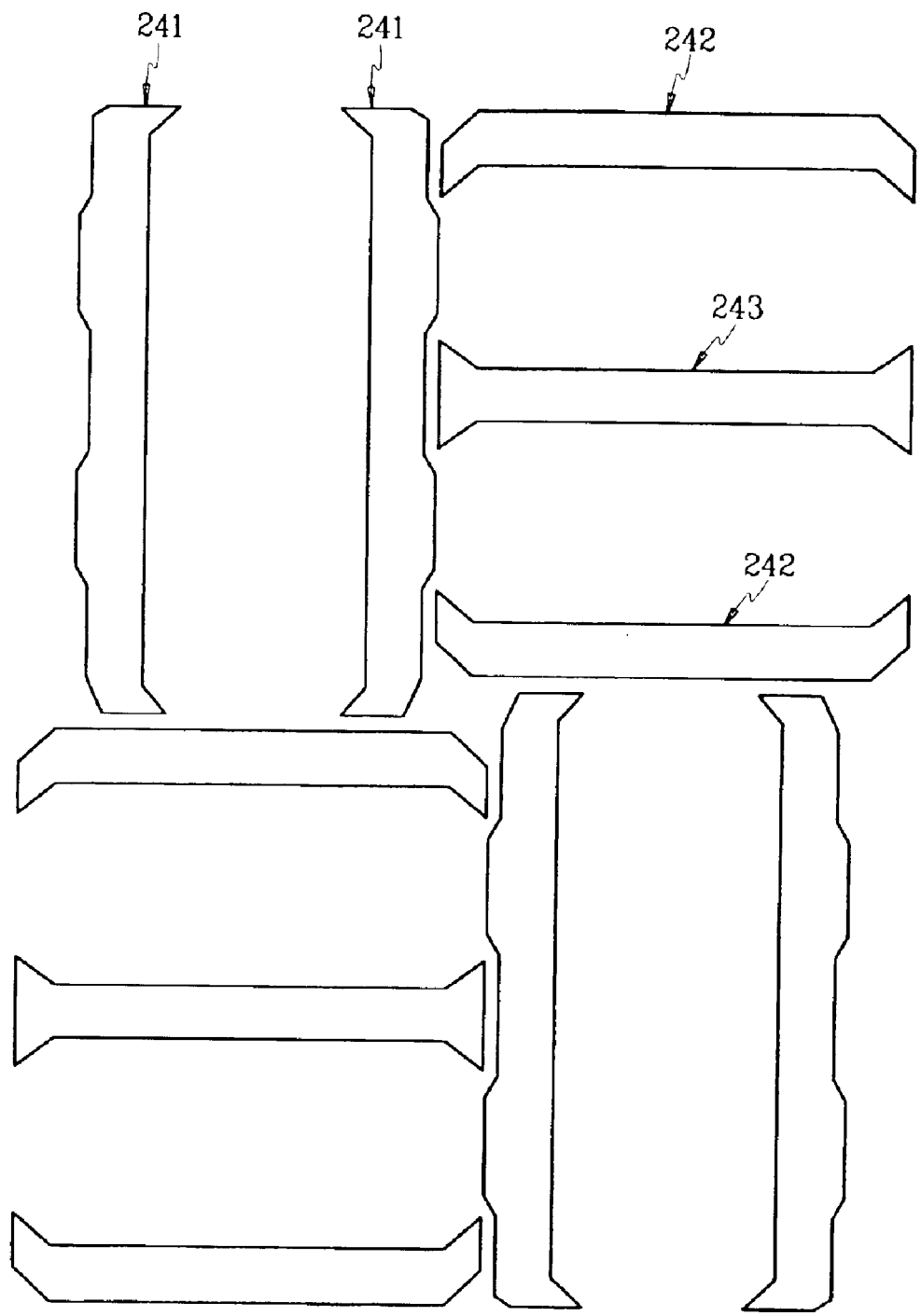
FIG. 13 illustrates an opening pattern of a common electrode for the liquid crystal display shown in FIG. 12.
Figure 14:
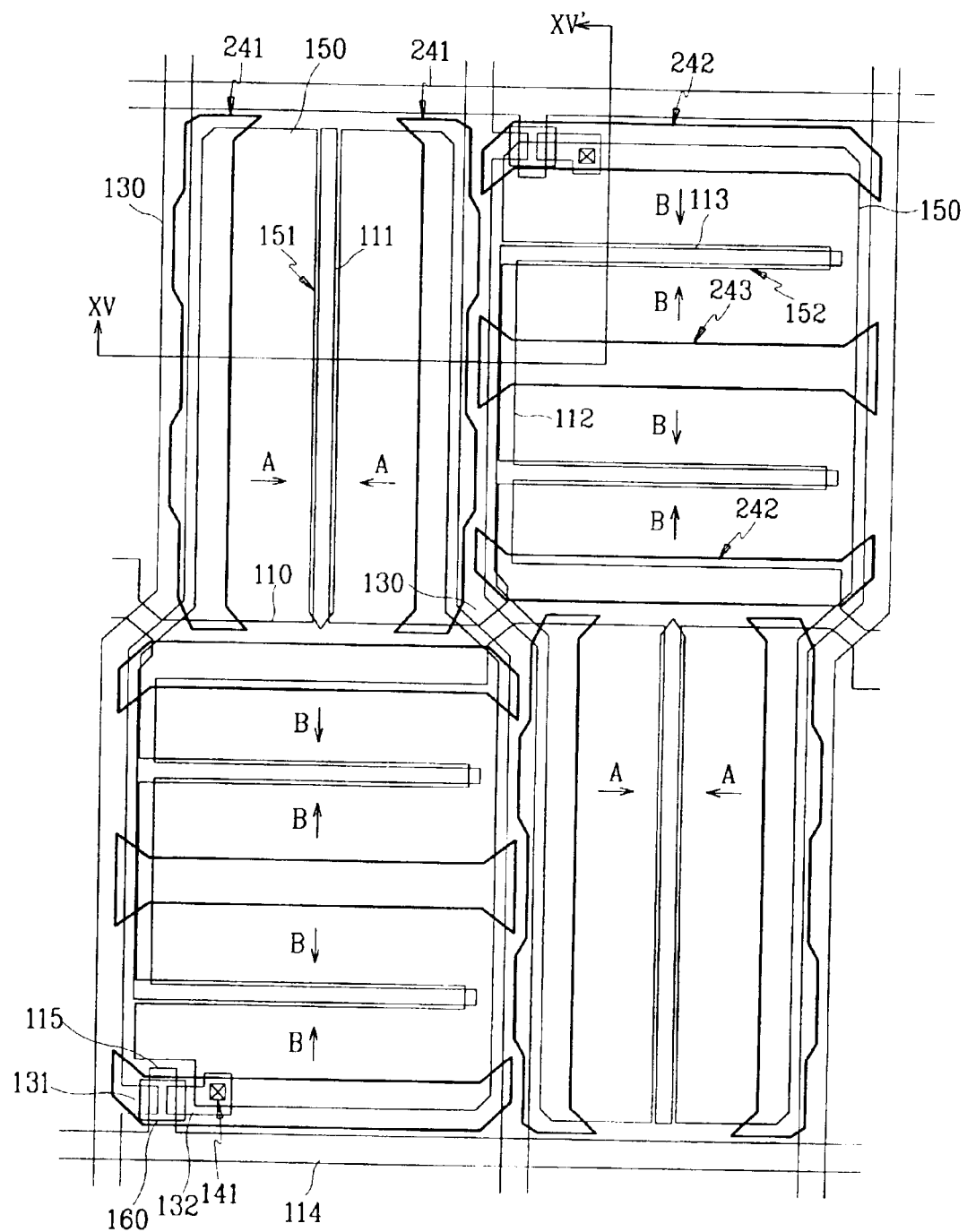
FIG. 14 illustrates the arrangement of the opening patterns of the pixel and the common electrodes for the LCD shown in FIG. 12.
Figure 15:
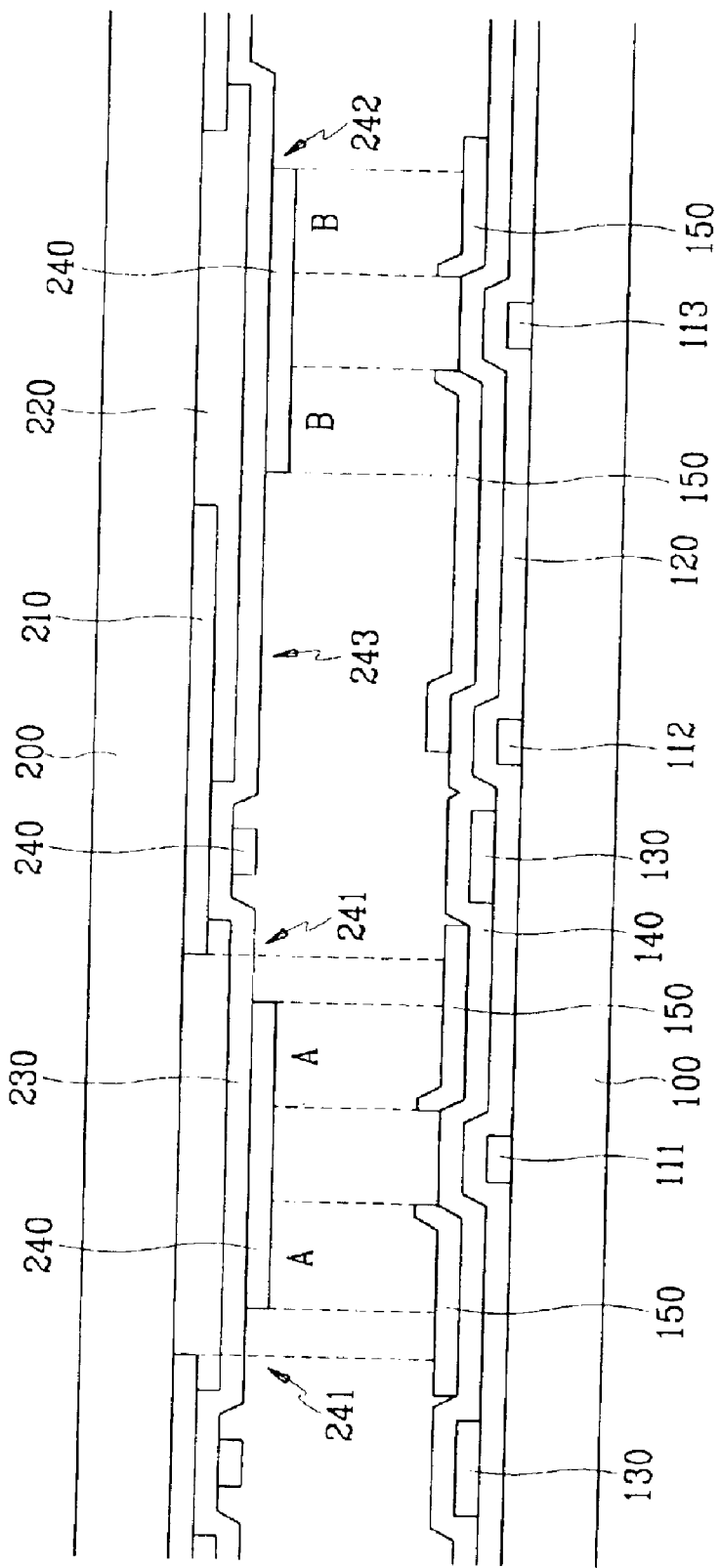
FIG. 15 is a cross sectional view of the LCD taken along the XV–XV' line of FIG. 14.

FIG. 12 is a plan view of a LCD according to a second preferred embodiment of the present invention where an opening pattern of a pixel electrode is illustrated, and FIG. 13 illustrates an opening pattern of a common electrode for the LCD. FIG. 14 illustrates the arrangement of the opening patterns of the pixel and the common electrodes for the LCD. FIG. 15 is a cross sectional view of the LCD taken along the XV–XV' line of FIG. 14.

As shown in the drawings, a gate line assembly and a storage capacitor line assembly are formed on an insulating substrate 100. The gate line assembly includes gate lines 114 proceeding in the horizontal direction, and gate electrodes 115 protruded from the gate lines 114 to form TFTs. The storage capacitor line assembly includes storage capacitor lines 110 proceeding in the same direction as the gate lines 114. Each storage capacitor line 110 has a plurality of linear portions with a large width arranged around an imaginative straight line up and down in an alternate manner, and connectors with a small width interconnecting the linear portions. First and second storage capacitor electrodes 111 and 112 are connected to the storage capacitor lines 110 while proceeding in the vertical direction. Third storage capacitor electrodes 113 are connected to the second storage capacitor electrode 112 while proceeding in the horizontal direction.

A gate insulating layer 120 is formed on the gate line assembly and the storage capacitor line assembly.

A semiconductor pattern 160 is formed on the gate insulating layer 120 with hydrogenated amorphous silicon. The semiconductor pattern 160 is overlapped with the gate electrodes 115.

Ohmic contact patterns (not shown) are formed on the semiconductor pattern 160 with $n^+$ hydrogenated amorphous silicon where n type impurities are doped at high concentration. The ohmic contact patterns are separated from each other around the gate electrode 115.

A data line assembly is formed on the ohmic contact patterns. The data line assembly includes data lines 130 proceeding in the vertical direction. Each data line 130 has a plurality of linear portions with a large width arranged around an imaginative straight line left and right in an alternate manner, and connectors with a small width interconnecting the linear portions. The distance between the neighboring linear portions placed around the imaginative straight line left and right is controlled in consideration of the occupation ratios of the upper and lower domains and the left and right domains. In the two neighboring data lines 130, the corresponding linear portions are placed around the relevant imaginative straight lines left and right. In this structure, a narrow region and a wide region are repeatedly present between the two neighboring data lines 130. This structure is kept in the left and right directions as well as in the upper and lower directions. The data lines 130 cross over the gate lines 114 while forming pixel regions. The data lines 130 also cross over the storage capacitor lines 110 at the connectors thereof.

A passivation layer 140 is formed on the data lines 130. A pixel electrode 150 is formed on the passivation layer 140 at each pixel region with indium tin oxide (ITO) or indium zinc oxide (IZO). The pixel electrode 150 is connected to the drain electrode 132 through a contact hole 141. The pixel electrode 150 has a narrow portion where a first opening portion 151 is longitudinally formed in the vertical direction, and a wide portion where second opening portions 152 are longitudinally formed in the horizontal direction. The narrow portion of the pixel electrode 150 is bisected by the first opening portion 151 to the left and right, and the wide portion thereof is trisected by the second opening portions 152 above and below. That is, the wide portion of the pixel electrode 150 is formed with top, middle and bottom sub-portions, and the middle sub-portion thereof has a width two times greater than the top and the bottom sub-portions. The first opening portion 151 is overlapped with the first storage capacitor electrode 111, and the second opening portions 152 are overlapped with the third storage capacitor electrodes 113.

A color filter substrate for the liquid crystal display will be now explained with reference to FIGS. 13 to 15.

A black matrix 210 is formed on an insulating substrate 200, and color filters 220 are formed at the black matrix 210. An overcoat layer 230 is formed on the color filters 220, and a common electrode 240 is formed on the overcoat layer 230 with a transparent conductive material such as ITO and IZO. The common electrode 240 has an opening pattern similar to that shown in FIGS. 2 and 4. That is, the common electrode 240 bears third opening portions 241 longitudinally extended in the vertical direction, and fourth and fifth opening portions 242 and 243 longitudinally extended in the horizontal direction. In the entire pixel structure, the neighboring sets of the fourth and fifth opening portions 242 and 243 are placed at the left and right sides of the set of the third opening portions 241, and the fifth opening portion 243 is placed between the fourth opening portions 242. The boundary of the third opening portion 241 close to the fourth and fifth opening portions 242 and 243 is hollowed such that the former can be separated from the latter.

As shown in FIGS. 14 and 15, the LCD is made through combining the TFT array substrate 100 with the color filter substrate 200 such that they are spaced apart from each other with a predetermined distance. After a liquid crystal material is injected between the substrates 100 and 200, the substrates 100 and 200 are sealed together. The liquid crystal molecules are oriented in the absence of an electric field between the pixel and the common electrodes 150 and 240 such that the directors thereof are vertically aligned with respect to the substrates 100 and 200.

The third opening portions 241 are overlapped with the left and right boundaries of the narrow portion of the pixel electrode 150, and the fourth opening portions 242 are overlapped with the top and bottom boundaries of the wide portion of the pixel electrode 150. The fifth opening portion 243 is positioned at the place where the wide portion of the pixel electrode 150 is bisected up and down. Therefore, the narrow portion of the pixel electrode 150 is partitioned into two micro-domains by way of the first and the third opening portions 151 and 241. The wide portion of the pixel electrode 150 is partitioned into four micro-domains by way of the second opening portion 152, and the fourth and fifth opening portions 242 and 243. The width of the micro-domain is preferably established to be 20±5□. The width of the micro-domain is determined in consideration of the occupation ratios of the upper and lower domains B and of the left and right domains A. When the width of the micro-domain is too narrow, the opening ratio becomes deteriorated. By contrast, when the width of the micro-domain is too wide, fringe fields are formed so weak that it is not easy to control the inclining direction of the liquid crystal molecules. The occupation ratio of the upper and lower domains B is higher than that of the left and right domains A. It is preferable that the occupation ratio of the upper and lower domains B to the entire pixel region should be established to be 60–90%.

With the formation of the above-structured pixel electrode 150 and the opening pattern for domain partitioning, the opening ratio can be significantly enhanced.

In the above-structured LCD, all of the micro-domains have a rectangular shape so that advantages are made with respect to the response speed, and minimization in the occurrence of texture at the edge of the micro-domain.

Figure 16:
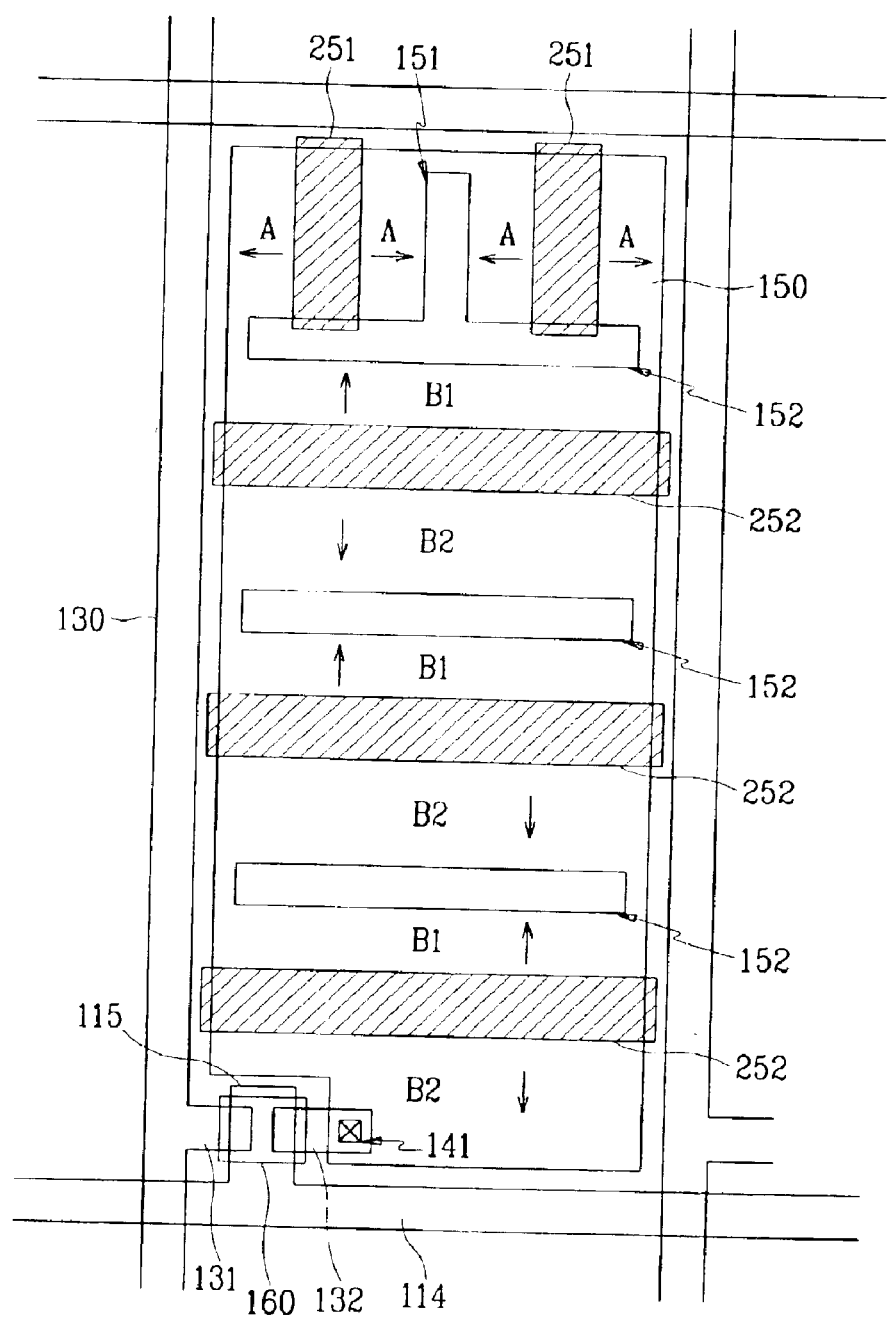
FIG. 16 is a plan view of a LCD according to a third preferred embodiment of the present invention.

FIG. 16 is a plan view of a LCD according to a third preferred embodiment of the present invention. In this preferred embodiment, other components and structure are the same as those related to the first preferred embodiment except that the opening pattern and the protrusion pattern are arranged in a different manner.

The pixel region is partitioned into a plurality of micro-domains A, B1 and B2 by way of the opening pattern and the protrusion pattern. The micro-domains A, B1 and B2 are classified into left and right domains A and upper and lower domains B1 and B2. Under the application of an electric field between the pixel and the common electrodes 150 and 240, the directors of the liquid crystal molecules are inclined in the left and right directions at the left and right domains A, and inclined in the upper and lower directions at the upper and lower domains B1 and B2. The upper and lower domains B1 and B2 are in turn classified into first upper and lower domains B1, and second upper and lower domains B2. The first upper and lower domains B1 bear a width narrower than the second upper and lower domains B2. Under the application of an electric field, the inclining direction of the liquid crystal molecules at the first upper and lower domains B1 is opposite to that of the liquid crystal molecules at the second upper and lower domains B2. The inclining directions of the directors of the liquid crystal molecules are indicated in FIG. 16 by way of arrows.

That is, in this preferred embodiment, the occupation ratios of the first and second upper and lower domains B1 and B2 are controlled through differentiating the domain width. Alternatively, the occupation ratios of the first and second upper and lower domains B1 and B2 may be controlled through differentiating the number of domains.

As described above, the occupation ratios of the first and second domains B1 and B2 are controlled in a different manner so that the left and right visibility can be improved while securing either the upper visibility or the lower visibility by a predetermined degree. As the upper visibility is more important that the lower visibility for the display use, the occupation ratios of the first and second upper and lower domains B1 and B2 are preferably controlled such that the upper visibility can be enhanced.

In order to make domain partitioning, an opening pattern is formed with or without a protrusion pattern. Alternatively, only a protrusion pattern may be formed to make the domain partitioning. That is, the above structure may be applied for use in any LCD where a pixel region is partitioned into a plurality of micro-domains, thereby obtaining wide viewing angle.

As described above, in the multi-domain LCD, the occupation ratios of the upper and lower domains as well as the left and right domains are differentiated so that the visibility in the target direction can be enhanced.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A liquid crystal display, comprising:
   a first insulating substrate;
   a first wiring line assembly formed on the first insulating substrate including a plurality of first wiring lines;
   a second wiring line assembly crossing over the first wiring line assembly including a plurality of second wiring lines to define pixel regions and insulated from the first wiring line assembly;
   a pixel electrode formed at each pixel region, the pixel electrode is formed in a substantially rectangular shape having a long side and a short side;
   a thin film transistor connected to the first wiring line assembly, the second wiring line assembly, and the pixel electrode;
   a second insulating substrate facing the first insulating substrate;
   a common electrode formed on the second insulating substrate;
   a first domain partitioning member formed at any one of the first and the second insulating substrates; and
   a second domain partitioning member formed at any one of the first and the second insulating substrates,
   wherein the first and the second domain partitioning members partition the pixel region into a plurality of left and right domains, directors of liquid crystal molecules in the left and right domains are arranged substantially parallel to the short side when an electric field is formed between the pixel electrode and the common electrode and a plurality of upper and lower domains directors of liquid crystal molecules in the upper and lower domains are arranged substantially parallel to the long side when an electric field is formed between the pixel electrode and the common electrode, and
   an area occupied by the upper and lower domains is larger than the area occupied by the left and right domains.

2. The liquid crystal display of claim 1, wherein the area occupied by the upper and lower domains is about 60–90% of the entire pixel region.

3. The liquid crystal display of claim 1, wherein the area occupied by the upper and lower domains is about 80% or more of the entire pixel region.

4. The liquid crystal display of claim 1, wherein an opening pattern is formed in the pixel electrode as the first domain partitioning member.

5. The liquid crystal display of claim 1, wherein an opening pattern is formed in the common electrode as the second domain partitioning member.

6. The liquid crystal display of claim 1, wherein a protrusion pattern is formed on the common electrode as the second domain partitioning member.

7. The liquid crystal display of claim 1, wherein the pixel electrode is arranged between a plurality of first and second wiring lines and sides of the pixel electrode close to the wiring lines are patterned with the same outline as the first and second wiring lines.

8. The liquid crystal display of claim 7, wherein an opening pattern is formed in the pixel electrode as the first domain partitioning member having first and second opening portions, the first opening partitions a narrow portion of the pixel electrode along the direction of the second wiring line and the second opening portion partitions a wide portion of the pixel electrode along the direction of the first wiring line.

9. The liquid crystal display of claim 8, further comprising a storage capacitor line assembly crossing over the second wiring line assembly and is insulated from the second wiring line assembly,
   wherein the storage capacitor line assembly includes first and second storage capacitor lines overlapped with the first and the second opening portions, respectively.

10. The liquid crystal display of claim 1, wherein the upper and lower domains are classified into first and second upper and lower domains and the area occupied by the first upper and lower domains is larger than the area occupied by the second upper and lower domains.

11. The liquid crystal display of claim 1, further comprising a vertically aligned liquid crystal layer.

12. A liquid crystal display, comprising:
    a first insulating substrate;
    a second insulating substrate formed over and facing the first insulating substrate;
    a plurality of first lines formed on the first insulating substrate and extending in a first direction;
    a plurality of second lines insulated from and intersecting the plurality of first lines and extending in a second direction, wherein intersections of the first and second lines define a plurality of pixel regions;
    a plurality of pixel electrodes, each provided at each pixel region, and having a substantially rectangular shape with a long side and a short side;
    a plurality of thin film transistors arranged in the pixel regions;
    a first domain partitioning member formed on the first insulating substrate within each pixel region; and
    a second domain partitioning member formed on the second insulating substrate within each pixel region,
    wherein the first and second domain partitioning members partition the pixel region into a plurality of first regions, each first region comprising a first domain and a second domain arranged in the second direction, directors of liquid crystals in the first region being oriented substantially parallel to the long side of the corresponding pixel electrode when an electric field is applied to the liquid crystals, and
    the first region occupies about 60% to about 90% of the corresponding pixel region.

13. The liquid crystal display of claim 12, wherein the first domain partitioning member includes an opening formed in the pixel electrode.

14. The liquid crystal display of claim 12, wherein the second domain partitioning member comprises an opening formed in a common electrode arranged on the second insulating substrate.

15. The liquid crystal display of claim 12, wherein the second domain partitioning member comprises a protrusion formed on a common electrode.

16. The liquid crystal display of claim 15, wherein the second domain partitioning member further comprises an opening formed in the common electrode.

17. The liquid crystal display of claim 15, further comprising a storage capacitor line insulated from and crossing over at least one of the plurality of second wires.

18. The liquid crystal display of claim 16, further comprising a vertically aligned liquid crystal layer.

19. The liquid crystal display of claim 16, wherein the first region occupies about 80% or more of the corresponding pixel region.

20. The liquid crystal display of claim 12, wherein the first and second domain partitioning members partition the pixel region into the plurality of first regions and a plurality of second regions, each second region comprising a third domain and a fourth domain arranged in the first direction.

21. The liquid crystal display of claim 20, wherein directors of liquid crystals in the second region are oriented substantially parallel to the short side of the corresponding pixel electrode.

* * * * *